United States Patent
Veeramreddi et al.

(10) Patent No.: US 11,444,537 B2
(45) Date of Patent: Sep. 13, 2022

(54) POWER CONVERTERS AND COMPENSATION CIRCUITS THEREOF

(71) Applicant: TEXAS INSTRUMENTS INCORPORATED, Dallas, TX (US)

(72) Inventors: Srinivas Venkata Veeramreddi, Hyderabad (IN); Sudhir Polarouthu, Hyderabad (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/806,010

(22) Filed: Mar. 2, 2020

(65) Prior Publication Data

US 2020/0274447 A1    Aug. 27, 2020

Related U.S. Application Data

(63) Continuation of application No. 14/070,191, filed on Nov. 1, 2013, now Pat. No. 10,581,326.

(51) Int. Cl.
*H02M 3/158*    (2006.01)

(52) U.S. Cl.
CPC ................................ *H02M 3/1582* (2013.01)

(58) Field of Classification Search
CPC .... H02M 3/1582; H02M 3/155; H02M 3/156; H02M 3/158
See application file for complete search history.

(56) References Cited

U.S. PATENT DOCUMENTS

| | | |
|---|---|---|
| 7,402,989 B2 | 7/2008 | Chen et al. |
| 8,288,953 B1 | 10/2012 | Mei |
| 8,570,011 B2 | 10/2013 | Gritti |
| 2003/0006809 A1 | 1/2003 | Enriquez |
| 2010/0148740 A1 | 6/2010 | Saitoh |
| 2010/0237836 A1 | 9/2010 | Fahrenbruch et al. |

FOREIGN PATENT DOCUMENTS

TW    200729253 A    8/2007

*Primary Examiner* — Nguyen Tran
(74) *Attorney, Agent, or Firm* — Carl G. Peterson; Charles A. Brill; Frank D. Cimino

(57) ABSTRACT

In an embodiment, a circuit includes a Direct Current (DC)-DC buck-boost converter and a controller. The controller includes an error amplifier configured to receive a feedback signal responsive to an output signal of the buck-boost converter. The error amplifier is configured to compare the feedback signal and a reference signal to generate an error signal. The controller includes a modulator circuit that is configured to receive the error signal and compare the error signal with a periodic ramp signal to generate a modulated signal. The controller further includes a digital logic block to generate switching signals in response to the modulated signal that is fed to the buck-boost converter to control the output signal of the buck-boost converter. The controller includes a capacitance multiplier circuit coupled to the output of the error amplifier to configure a dominant pole so as to compensate the buck-boost converter.

19 Claims, 6 Drawing Sheets

POWER CONVERTERS AND COMPENSATION CIRCUITS THEREOF

CROSS-REFERENCE TO RELATED APPLICATIONS

The present application is a continuation of U.S. patent application Ser. No. 14/070,191, filed Nov. 1, 2013, which is incorporated herein by reference in its entirety.

TECHNICAL FIELD

The present disclosure generally relates to electrical and electronic circuits, and more particularly to power converters and compensation circuits used in the power converters.

BACKGROUND

In accordance with an example scenario, switching regulators, for example, power converters, are implemented in various electrical and electronic devices. With increasing usage of portable and hand-held devices, such as mobile phones, personal digital assistants (PDAs), global positioning system (GPS) devices, and the like, a single power supplying battery may be implemented in such devices. Such devices may have various components having different power parameters; for example, some component from among these devices may be configured to utilize a power supply of 3.6 volts (V), some components may be configured to utilize a power supply of 3.3 V, and some components may be configured to utilize a power supply of 1.8 V. All these various power supply levels are generated from a single power source (for example, a 3V battery) by a DC-DC power converter. Accordingly, the DC-DC converter is used appropriately to buck (where generated output is less than input) or boost (where generated output is more than input) or buck-boost (where generated output may be less or more than input) the input power source to serve the power supply requirement of different components of such devices. The open loop frequency response of these converters is typically of second order and requires compensation. Boost and buck-boost converters have a Right Half Plane Zero (RHPZ) in their open loop transfer function. The presence of the RHPZ makes it difficult to compensate boost and buck-boost converters compared to a compensation of buck converter.

SUMMARY

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

Various circuits for compensation of buck-boost and boost converters are disclosed. In an embodiment, a circuit includes (1) a Direct Current (DC)-DC buck-boost converter having an output for generating an output signal and (2) a controller coupled with the DC-DC buck-boost converter. The controller includes an error amplifier having a first input terminal, a second input terminal and an output terminal, where the error amplifier is configured to receive a feedback signal responsive to the output signal of the DC-DC buck-boost converter at the first input terminal and to receive a reference signal at the second input terminal. The error amplifier is configured to compare the feedback signal and the reference signal so as to generate an error signal at the output terminal of the error amplifier.

The circuit includes a modulator circuit coupled with the output terminal of the error amplifier, where the modulator circuit is configured to receive the error signal and compare the error signal with a periodic ramp signal so as to generate a modulated signal at an output of the modulator circuit. The circuit further includes a digital logic block connected with the output of the modulator circuit in order to generate one or more switching signals in response to the modulated signal, where the one or more switching signals is fed to the DC-DC buck-boost converter in order to control the output signal of the DC-DC buck-boost converter. The circuit includes a first compensation circuit comprising a capacitance multiplier circuit coupled with the output of the error amplifier in order to configure a dominant pole in a transfer function of the circuit so as to place a right half plane zero beyond a Unity Gain Bandwidth (UGB) of the DC-DC buck-boost converter.

Additionally, in one embodiment, a circuit includes (1) a DC-DC boost converter having an output for generating an output signal and (2) a controller coupled with the DC-DC boost converter. The controller includes an error amplifier having a first input terminal, a second input terminal and an output terminal, where the error amplifier is configured to receive a feedback signal responsive to the output signal of the DC-DC boost converter at the first input terminal and to receive a reference signal at the second input terminal. The error amplifier is configured to compare the feedback signal and the reference signal so as to generate an error signal at the output terminal of the error amplifier.

The circuit includes a modulator circuit coupled with the output terminal of the error amplifier, where the modulator circuit is configured to receive the error signal and compare the error signal with a periodic signal in order to generate a modulated signal at an output of the modulator circuit. The circuit further includes a digital logic block connected with the output of the modulator circuit in order to generate one or more switching signals in response to the modulated signal, where the one or more switching signals is fed to the DC-DC boost converter so as to control the output signal of the DC-DC boost converter. The circuit includes a first compensation circuit comprising a capacitance multiplier circuit coupled with the output of the error amplifier in order to configure a dominant pole in a transfer function of the circuit so as to place the right half plane zero beyond the UGB of the DC-DC boost converter.

In another embodiment, a controller for compensation of a power converter is disclosed. The controller includes a first compensation circuit and a second compensation circuit. The first compensation circuit includes a capacitance multiplier circuit and a resistor. The resistor couples an output terminal of an error amplifier of the power converter to the capacitance multiplier circuit. The capacitance multiplier circuit and the resistor are configured to configure a dominant pole and a first zero in a cascaded transfer function of the controller and the power converter. The second compensation circuit is coupled with at least one input terminal of the error amplifier. The second compensation circuit is configured to generate a pole and a second zero in the transfer function of the power converter. The dominant pole, the pole, the first zero and the second zero are configured to compensate a closed loop response of the power converter. For example, the compensated power converter has a frequency response that has a good phase and gain margin even in the presence of the LC double pole and the RHPZ of the power converter.

DETAILED DESCRIPTION

In the following detailed description, numerous specific details are set forth in order to provide a thorough understanding of the present technology. However, the present technology may be practiced without these specific details. In other instances, well-known methods, procedures, components, and circuits have not been described in detail so as to not unnecessarily obscure aspects of the example embodiments presented herein. Moreover, it is noted that structures and devices are shown in block diagram form in order to avoid obscuring the disclosure.

Reference in this specification to "one embodiment" or "an embodiment" means that a particular feature, structure, or characteristic described in connection with the embodiment is included in at least one embodiment of the disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various parameters are described that may be parameters for some embodiments but not for other embodiments.

Various embodiments of the present technology provide circuit designs of power converters and compensation schemes thereof. These embodiments are described with reference to subsequent figures.

Figure 1A:
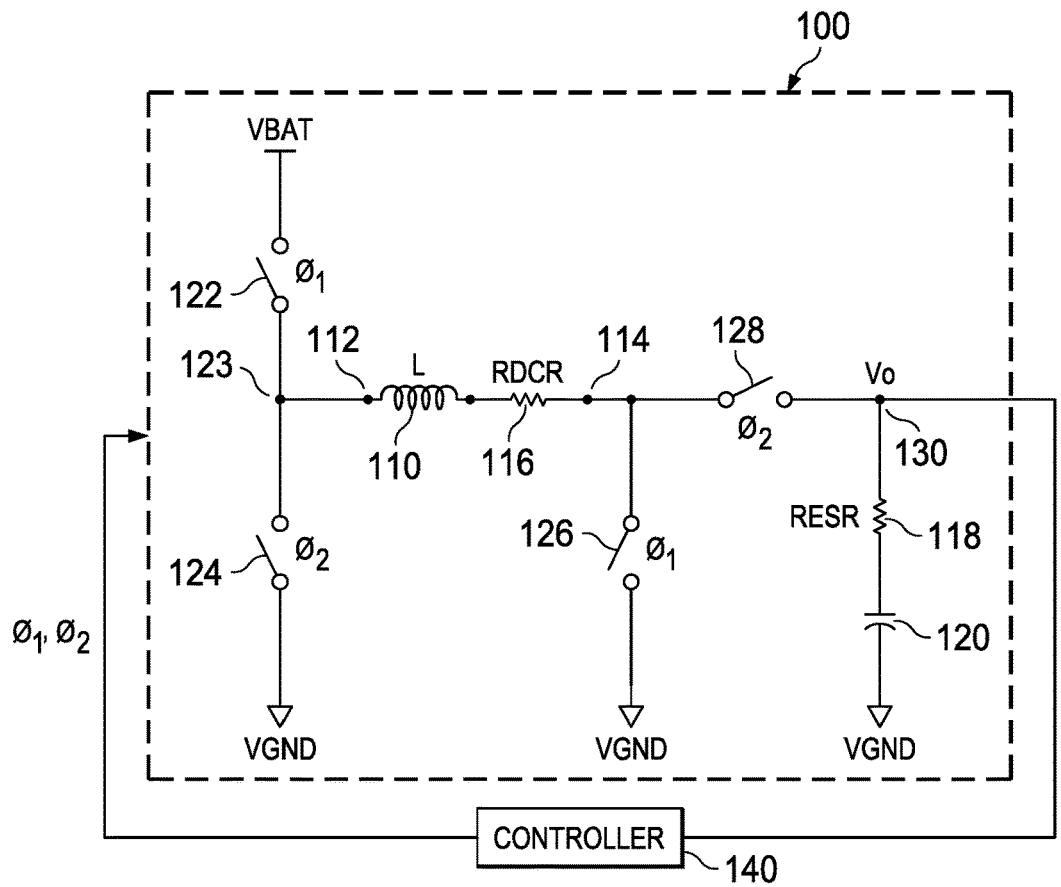
FIG. 1A illustrates a schematic representation of a buck-boost power converter in accordance with an example scenario.

Pursuant to an example scenario, an example circuit representation of a power converter 100 is shown in FIG. 1A. The power converter 100 may be an example of a DC-DC buck-boost convertor. The power converter 100 includes an inductor L (shown as 110) coupled with a capacitor C (shown as 120), and a plurality of switches such as 122, 124, 126 and 128 coupled between a power supply (shown as $V_{BAT}$) and a reference voltage supply (for example, a ground potential shown as $V_{GND}$). In the example shown in FIG. 1A, the switch 122 is coupled between the $V_{BAT}$ and a node 123, the switch 124 is coupled between the node 123 and the $V_{GND}$, a node 112 of the inductor 110 is coupled with the node 123. The switch 126 couples the node 114 of the inductor 110 with the $V_{GND}$. As shown in FIG. 1A, $R_{DCR}$ (shown as 116) is the equivalent parasitic DC resistance of the inductor 110 and it should be understood that the $R_{DCR}$ is not a distinct physical component. The switch 128 couples the node 114 to the capacitor 120 and a series equivalent resistor $R_{ESR}$ (shown by 118) of the capacitor 120 is coupled between the switch 128 and the capacitor 120.

The power converter 100 is a cascade combination of a buck converter followed by a boost converter, where the inductor 110 and the capacitor 120 can be used either for a buck-only mode, a boost-only mode or a buck-boost mode, based on controlling the ON/OFF of the switches 122, 124, 126 and 128. The switches 122-128 may be configured as a transistor based switch or a diode based switch. As shown in FIG. 1A, in the buck-boost mode, the switches 122 and 126 are controlled by a first switching signal (shown as Φ1), and the switches 124 and 128 are controlled by a second switching signal (shown as Φ2).

During the cycle when the first switching signal is asserted and the second switching signal is de-asserted (the switches 122 and 126 are in ON state, and the switches 124 and 128 are in OFF state), the voltage across the inductor 110 is input voltage ($V_{BAT}$). During this cycle, a load current is provided by the capacitor 120. It should be noted that the voltage of the capacitor 120 decreases during this cycle as the capacitor 120 provides energy to a load (not shown). Further, during the cycle when the second switching signal is asserted and the first switching signal is de-asserted (the switches 122 and 126 are in OFF state, and the switches 124 and 128 are in ON state), the inductor 110 is coupled to the capacitor 120 and the load. In this cycle, the energy stored in the inductor 110 is transferred for charging the capacitor 120 and the load current is provided.

It should be noted that based on a time for which $V_{BAT}$ is connected/or not connected to the inductor 110 (for example, during a cycle when the switches 122 and 124 are ON), the output voltage (Vo) at an output 130 (or the load) may be controlled. For instance, if the duty cycle of the converter 100 is more than 0.5, the output voltage (Vo) at the output 130 is higher than the input voltage ($V_{BAT}$). It should further be noted that if the duty cycle of the converter 100 is smaller than 0.5, the output voltage Vo at the output 130 is lower than the input. Thus, the converter 100 can either boost or buck the input voltage and hence referred to as buck-boost converter.

The switching signals (the first switching signal and the second switching signal) may be provided to the converter 100 through a controller 140. The controller 140 is configured to receive the output of the converter 100 and is configured to generate the first switching signal and the second switching signal based on the required mode (buck or boost) of operation of the converter 100 and the required output voltage (Vo). Thus, the controller 140 is configured to control the ON and OFF time of the switches (122, 124, 126 and 128) for operating the converter 100.

Figure 1B:
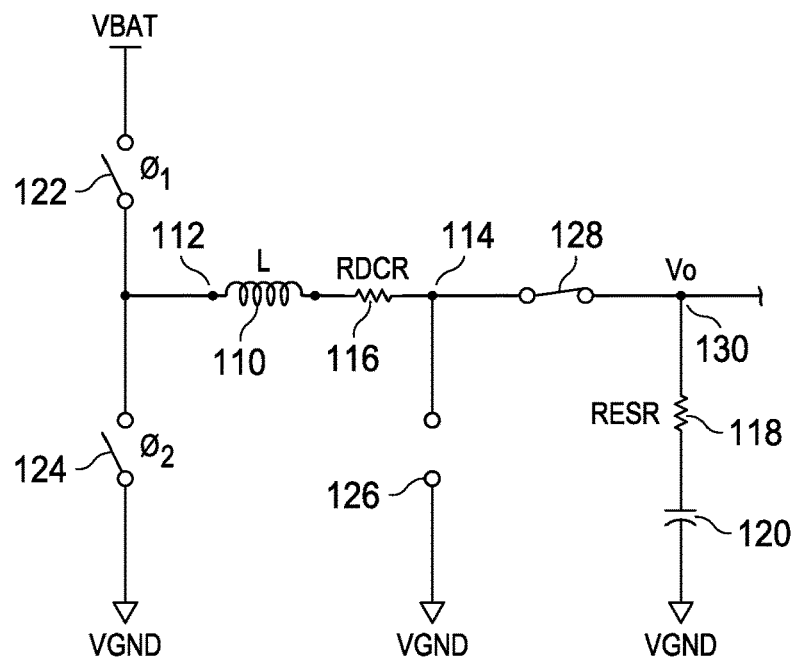
FIGS. 1B and 1C illustrate schematic representations of a forced buck and a forced boost power converters, respectively, derived from the buck-boost power converter of FIG. 1A in accordance with an example scenario.
Figure 1C:
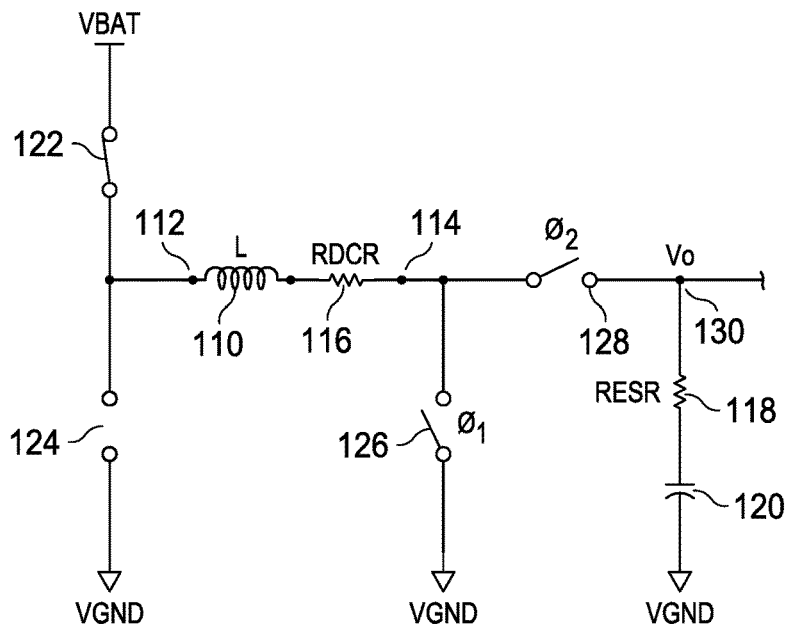

Some example forced buck and forced boost configurations of the converter that can be derived from the converter 100 are shown in FIGS. 1B and 1C, respectively. Referring now to FIG. 1B, the switch 126 is forced to be in OFF state (for example, an open switch) and the switch 128 is forced to be in ON state (for example, a closed switch) to configure the forced buck operation for the input voltage at the load (not shown). For instance, when the first switching signal (shown as (D1) is asserted and the second switching signal is de-asserted (the switch 122 is in ON state and the switch 124 is in OFF state), the voltage across the inductor 110 increases towards the input voltage ($V_{BAT}$), and during this time, the inductor 110 stores energy in the form of a magnetic field. Further, when the switch 122 is in OFF state and the switch 124 is in ON state, there is always a voltage drop across the inductor 110, and the net voltage seen by the load is always less than the input voltage ($V_{BAT}$).

Referring now to FIG. 1C, the switch 122 is forced to be in ON state and the switch 124 is forced to be in OFF state to configure the forced boost operation for the input voltage at the load (not shown). During a cycle, when the switch 126 is in ON state and the switch 128 is in OFF state, the voltage across the inductor 110 is the input power supply voltage ($V_{BAT}$). During this cycle, a load current is provided by the capacitor 120. It should be noted that the voltage of the capacitor 120 decreases during this cycle as the capacitor 120 provides energy to a load (not shown). Further, during the cycle when the switch 126 is in OFF state and the switch 128 is in ON state, the inductor 110 is coupled to the capacitor 120 and the load. In this cycle, the energy stored in the inductor 110 is transferred for charging the capacitor 120 and the load current is provided. Accordingly, the output voltage at the load is always more than the input voltage thereby configuring the boost operation.

Figure 1D:
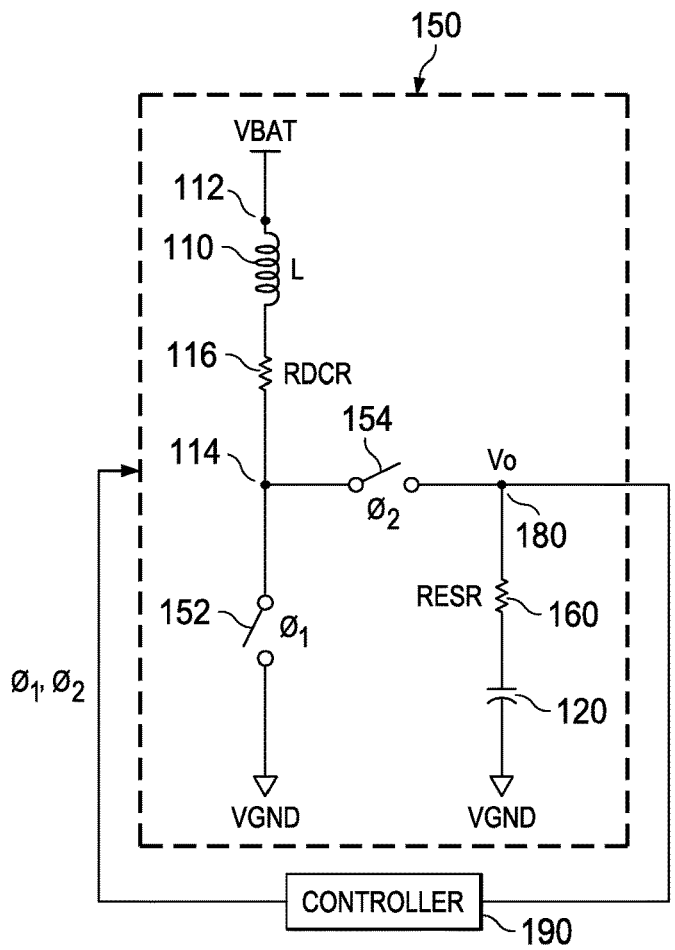
FIG. 1D illustrates a schematic circuit diagram of a boost power converter in accordance with an example scenario.

Another example scenario of a power converter 150 is shown in FIG. 1D. The power converter 150 may be an example of a DC-DC boost converter. In one form, the converter 150 includes the inductor 110 coupled to the capacitor 120, and a switch 152 (a first switch) and a switch 154 (the second switch). The output of the DC-DC boost converter 150 can be controlled by ON/OFF conditions of the switches 152 and 154. The switches 152 and 154 may be similar to the switches 122-128 described in reference to FIG. 1A, and in particular, the switch 152 may be controlled by the first switching signal ($\Phi 1$) and the switch 154 may be controlled by the second switching signal ($\Phi 2$). In the example shown in FIG. 1D, the first node 112 of the inductor 110 is coupled to the power supply ($V_{BAT}$) and the second node 114 of the inductor 110 is coupled to the switch 152. The node 114 of the inductor 110 is coupled to the capacitor 120 through the switch 154. In this example, the resistor 160 is shown as coupled between the switch 154 and the capacitor 120. The capacitor 120 is coupled to the reference supply (for example, ground, shown as $V_{GND}$).

During a cycle, when the switch 152 is in ON state and the switch 154 is in OFF state, the voltage across the inductor 110 is the input power supply voltage ($V_{BAT}$). During this cycle, a load current is provided by the capacitor 120. Further, the voltage of the capacitor 120 decreases during this cycle as the capacitor 120 provides energy to a load (not shown). Further, during a cycle when the second switching signal is asserted and the first switching signal is de-asserted (the switch 152 is in OFF state, and the switch 154 are in ON state), the inductor 110 is coupled to the capacitor 120 and the load. In this cycle, the energy stored in the inductor 110 is transferred for charging the capacitor 120 and the load current is provided. It should be noted that based on a time for which the inductor 110 (for example, during a cycle when the switch 154 is ON) is connected with the load, the output voltage (Vo) at an output 180 (or the load) may be controlled. Accordingly, based on the switching signals $\Phi 1$ and $\Phi 2$, voltage at the output 180 may be controlled.

It should be understood that a small signal gain (or cascaded transfer function of the converters 100 or 150 and the controller) in the converters 100 or 150 may be defined as per the following expression:

$$\left(\frac{V_{BAT}}{D_p^2} - \frac{I_{LOAD}R_{DCR}}{D_p^3}\right) \frac{\left(1 - \frac{sI_{LOAD}L}{D_pV_{BAT} - I_{LOAD}R_{DCR}}\right)(1 + sC_{OUT}R_{ESR})}{\left(\frac{s^2 LC_{OUT}}{D_p^2} + \frac{sC_{OUT}(R_{DCR} + R_{ESR})}{D_p^2} + 1\right)}$$

where $$D = \frac{V_o}{V_{BAT} + V_o}$$

for the converter 100, and $$D = \frac{V - V_{BAT}}{V_{BAT}}$$

for the converter 150, and $D_p = 1-D$, $V_{BAT}$ is the input battery voltage, Vo is output voltage, $I_{LOAD}$ is current flowing through the load, $R_{DCR}$ is the parasitic resistance of the inductor 110, L is the inductance of the inductor (110), $R_{ESR}$ is the parasitic resistance of the capacitor 120, $C_{OUT}$ is the capacitance of the capacitor (120). In the above expression of the small signal gain, there is a presence of a right half plane zero (RHPZ) due to a factor $$\left(1 - \frac{sI_{LOAD}L}{D_pV_{BAT} - I_{LOAD}R_{DCR}}\right),$$

and a LC double pole is also present. The RHPZ has the same 20 dB/decade rising gain magnitude as a conventional zero, but with 90° phase lag instead of lead. One way of compensating the effect of the RHPZ is to reduce the unity gain frequency significantly below the RHPZ frequency.

Figure 2:
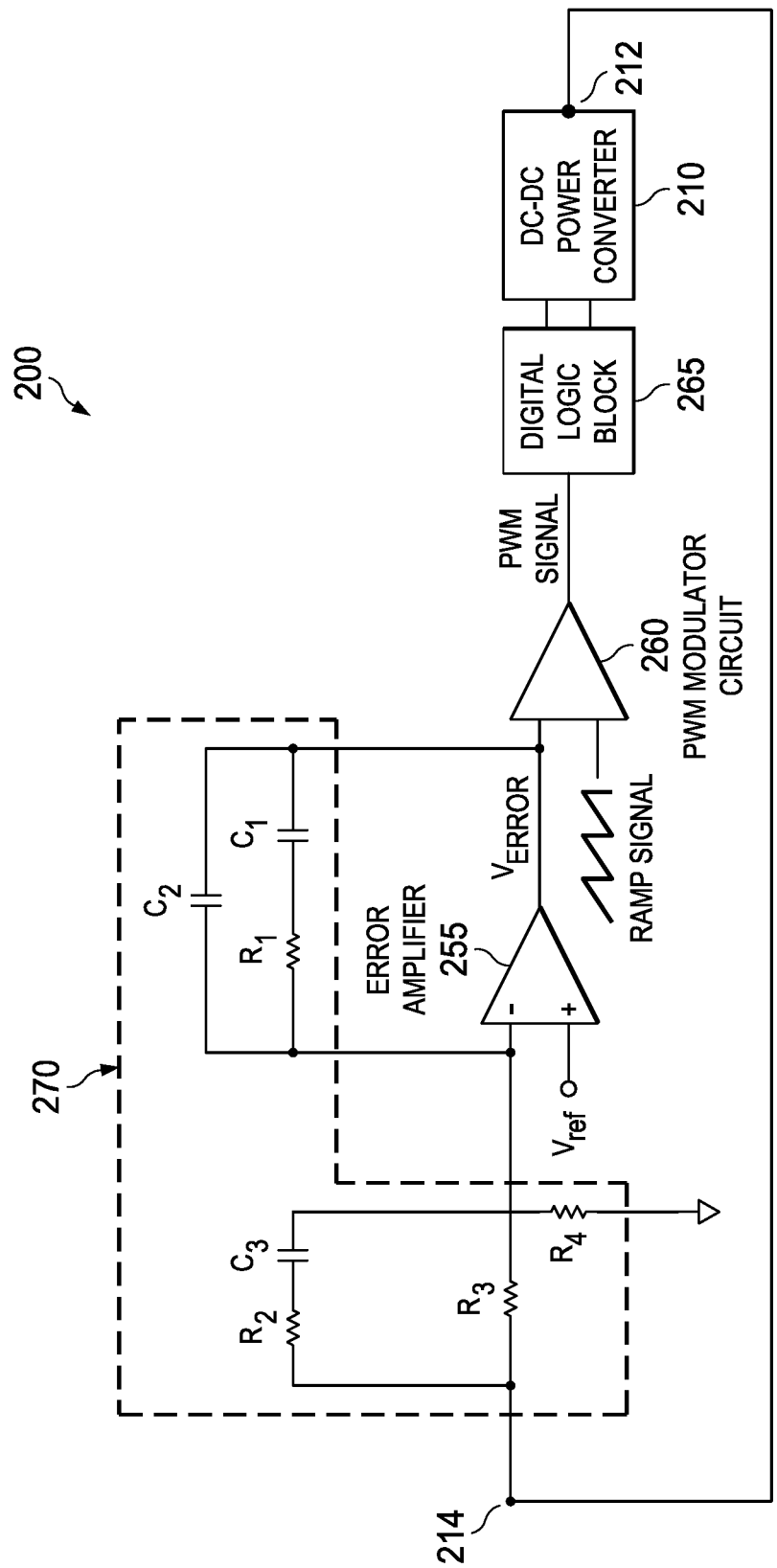
FIG. 2 illustrates a schematic circuit of a power converter and a controller circuit in accordance with an example scenario.

An example scenario of compensating the RHPZ is described in reference to FIG. 2. FIG. 2 represents a circuit representation for addressing the RHPZ issue in a power converter (such as the converters 100 and/or 150), in accordance with an example scenario.

The circuit 200 employs a type III compensation circuits for keeping the frequency associated with the RHPZ out of the unity gain bandwidth so as to compensate the effect of RHPZ. The circuit 200 includes a power converter 210 and a controller circuit employing the type III compensation circuit for controlling the operation of the converter 210 and for compensating the effect of the RHPZ. The power converter 210 may be an example of the buck-boost converter or a boost converter.

The controller circuit includes an error amplifier 255, a PWM modulator circuit 260, a digital logic block 265, and a compensation circuit 270. The compensation circuit 270 is an example of a type III compensation circuit for keeping the RHPZ out of the unity gain bandwidth so as to compensate the RHPZ. In this example scenario of FIG. 2, the compensation circuit 270 is coupled to the error amplifier 255. This scheme takes a sample of the output voltage of the DC-DC power converter 210 and subtracts this from a reference voltage to generate a small error signal ($V_{ERROR}$). The error signal is compared to a periodic ramp signal by the PWM modulator circuit 260. The output of the PWM modulator circuit 260 is a PWM signal that operates the switches present in the converter 210. It should be noted that when the voltage at the output of the converter 210 changes, the error signal also changes. As the error signal changes, a threshold against which the periodic ramp signal is compared also changes, thereby causing a change in pulse width of the PWM signal. As the pulse width of the PWM signal changes, the duty cycle of the converter 210 changes thereby moving the output voltage towards reducing the error at the output of the converter 210.

The compensation circuit 270 is configured by a first circuit having capacitors C1 and C2 connected in parallel configuration between an inverting input terminal and an output of the error amplifier 255. The first circuit also includes a resistor R1 connected in series with the capacitor C1. The compensation circuit 270 also includes a second circuit coupled to the inverting input terminal of the error amplifier 255 and a node 214 that receives the output signal from an output 212 of the converter 210. The second circuit is configured by resistors R2, R3 and R4 and a capacitor C3, as shown in FIG. 2.

The first circuit of the compensation circuit 270 generates a zero (due to R1 and C1) and two poles due to the capacitor C1 and C2. The second circuit of the compensation circuit 270 generates a zero (due to R2, R3 and C3), and a pole (due to R2 and C3). In this example scenario, the capacitor C2 sets a dominant pole, and the value of the capacitors C1, C2 and C3 are chosen such that the UGB frequency is much lower than the frequency associated with the RHPZ of the converter 210.

It should be noted that the compensation circuit 270 uses very large capacitors in order to compensate the RHPZ of the converter 210. For example, the values of the capacitors C1 and C3 are huge and are in the range of nano-farads (nF). For example, for a desired output voltage (Vo) of 3.3 V from an input voltage ($V_{BAT}$) of 3.6 V, the value of the capacitor C1 is about 4.25 nF and the value of the capacitor C3 is about 3.272 nF (Reference: "A Low Voltage, Dynamic, Non inverting, Synchronous Buck-Boost Converter for Portable Applications", Biranchinath Sahu, *Student Member, IEEE*, and Gabriel A. Rincón-Mora, *Senior Member, IEEE*). The circuit 200 provided in the example scenario of FIG. 2 has limitations, for example, configuring the capacitances of range of values of capacitors C1 and C3 costs a huge area on a chip. Otherwise, the capacitors C1 and C3 may be used as external component that is not desirable from cost and area perspective.

The present technology provides solutions for keeping the RHPZ out of the UGB without utilizing large values of the capacitors, and without the need of such external components, and these solutions overcome these and other limitations, in addition to providing currently unavailable benefits. Some embodiments of the present technology are described in reference to FIGS. 3 to 5. Various embodiments of the present technology are capable of providing solutions for compensating the LC double pole and the RHPZ present in the frequency responses of the converter 100, forced buck or forced boost converters derived from the converter 100, and the converter 150. Some of these example embodiments are explained with reference to FIGS. 3 to 6, however, it should be understood that the compensation of the LC double pole and the RHPZ can be implemented by way of other variations of the converters 100 and 150.

Figure 3:
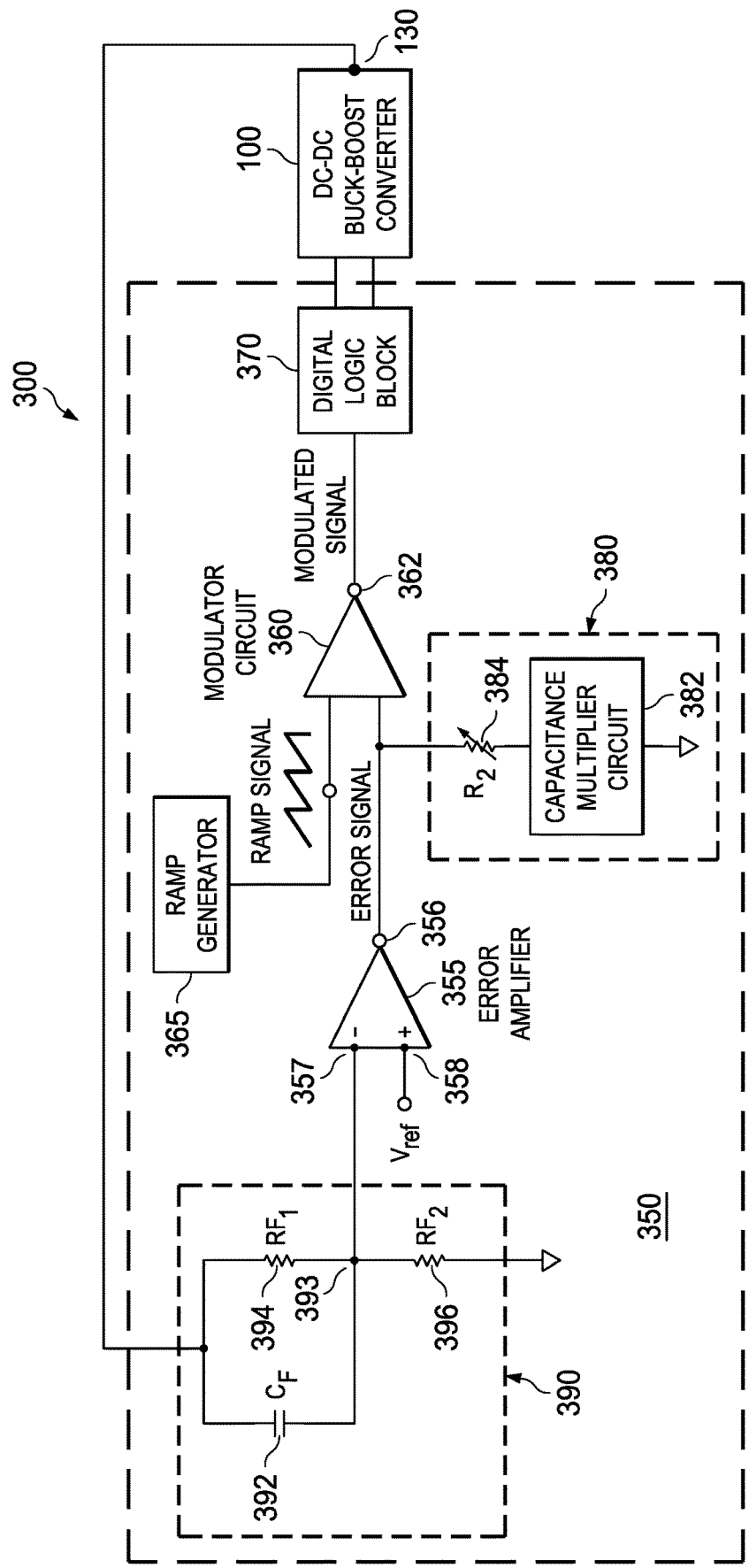
FIG. 3 illustrates an example schematic circuit diagram of a power converter and a controller in accordance with an example embodiment.

FIG. 3 illustrates an example circuit diagram of the power converter in accordance with an embodiment of the present technology. As shown in FIG. 3, a circuit 300 includes a DC-DC buck-boost converter such as the power converter 100 (also referred to as 'buck-boost converter 100') and a controller 350 for controlling and for compensation of the buck-boost converter 100.

The buck-boost converter 100 is described in reference to FIG. 1A, and its description is omitted for the sake of brevity. The controller 350 is coupled between an output terminal 130 (the first output terminal) of the converter 100 and input terminals of the converter 100. In one example, the controller 350 includes an error amplifier 355, a modulator circuit 360, a digital logic block 370 and a compensation circuit including a first compensation circuit 380 and a second compensation circuit 390.

The error amplifier 355 is configured to receive a feedback signal responsive to an output signal received from the output terminal 130 of the converter 100. The error amplifier 355 is configured to compare the feedback signal to a reference signal to generate an error signal. The feedback signal is received at a first input terminal 357 (for example, an inverting terminal) and the reference signal is received at a second input terminal 358 (for example, a non-inverting terminal) of the error amplifier 355. The modulator circuit 360 is coupled to an output terminal 356 (the second output terminal) of the error amplifier 355 to receive the error signal. The modulator circuit 360 is configured to receive a periodic ramp signal (for example, a signal having a saw tooth waveform) and based on the comparison of the ramp signal and the error signal, the modulator circuit 360 generates a modulated signal. In an example, the circuit 300 includes a ramp generator 365 for generating the periodic ramp signal. In an example, the modulated signal is a Pulse Width Modulation (PWM) signal. For instance, if the ramp signal is higher than the error signal, a high (or low) logic level is introduced at an output (shown as 362) of the modulator circuit 360, and if the ramp signal is lower than the error signal, a low (or high) logic level is generated at the output 362.

It should be noted that the pulse width of the PWM signal is varied depending upon the error signal (that is proportional to the change in the output of the converter 100). The digital logic block 370 is coupled to the output 362 of the modulator circuit 360, and is configured to generate one or more switching signals in response to the modulated signal. The switching signals are fed to the converter 100 for controlling one or more switches (for example, the switches 122-128) of the converter 100, so as to generate the output signal at the output 130 of the converter 100.

The first compensation circuit 380 includes a capacitance multiplier circuit 382 coupled to the output terminal 356 of the error amplifier 355 for configuring a dominant pole so as to compensate a right half plane zero of the converter 100. In an embodiment, the first compensation circuit 380 can also include a resistor 384 coupled to the capacitance multiplier circuit 382. As shown in FIG. 3, the resistor 384 connects the capacitance multiplier circuit 382 and the output terminal 356 of the error amplifier 355. The capacitance multiplier circuit 382 is further described with reference to FIG. 4. In an embodiment, the capacitance multiplier circuit 382 and the resistor 384 are configured to generate the dominant pole and a zero.

The second compensation circuit 390 is configured to generate a pole and a zero. It should be understood that the second compensation circuit 390 can be realized in many ways by utilizing electronic and electrical components for generating the pole and the zero. In one implementation as shown in FIG. 3, the second compensation circuit 390 includes a capacitor $C_F$ (shown as 392) and a resistor RF1 (shown as 394) coupled in the parallel configuration between the output 130 of the converter 100 and a node 393. The second compensation circuit 390 also includes a resistor 396 connected between the node 393 and ground. The node 393 is connected to a terminal (such as the inverting terminal, shown as 357) of the error amplifier 355.

Figure 4:
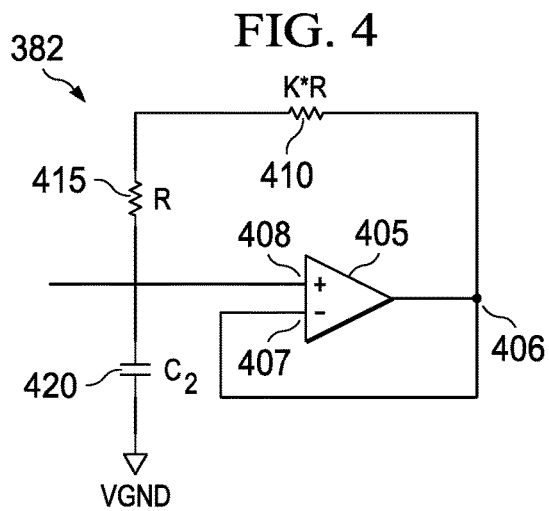
FIG. 4 illustrates an example circuit diagram of a capacitance multiplier circuit in accordance with an example embodiment.

An example representation of the capacitance multiplier circuit 382 is shown in FIG. 4. As shown in FIG. 4, the capacitance multiplier circuit 382 is configured by an operational amplifier 405, resistors 410 and 415 and a capacitor C2 (shown as 420). An output terminal 406 of the operational amplifier 405 is coupled to an inverting terminal 407 (a first input terminal) of the operational amplifier 405. The output terminal 406 is coupled to a non-inverting terminal 408 of the operational amplifier 405 through the resistors 410 and 415. The capacitor 420 is applied between the non-inverting terminal 408 and ground (shown as $V_{GND}$).

The capacitance multiplier circuit 382 is coupled to the output terminal 356 of the error amplifier 355. As shown in the FIG. 4, the resistance of the resistor 410 is K*R and the resistance of the resistor 415 is R. It should be noted that the capacitance multiplier circuit 382 uses a small capacitor (C2) to simulate an effective large capacitor. For example, the equivalent capacitance (that is in series with the resistor R2 (shown by 384) between the output terminal 356 and the ground potential) is C2*(K+1). For instance, a current flows from an input source (for example, from the output terminal 356) to the capacitor (C2) through resistor 415. If the value of K is 100 (resistor 410 is configured as 100 times larger than resistor 415), the current through C2 is 100 times more than the current through the resistor 410. Accordingly, for a given input voltage, the equivalent capacitance is equal to C2*(100+1) that is effective in series with the resistor R2 (shown by 384).

Referring again to FIG. 3, the first compensation circuit 380 and the second compensation circuit 390 introduce two poles and two zeros into the transfer function of the circuit 300 for compensating the LC double pole and RHPZ present in the frequency response of the converter 100. An example representation of a transfer function of the circuit 300 including the converter 100 (for example, a cascaded transfer function of the converter 100 and the controller 350) can be defined by the expression:

$$= \left\{ \frac{\left(\frac{V_{BAT}}{D_p^2} - \frac{I_{LOAD} R_{DCR}}{D_p^3}\right)}{V_{RAMP}} * \frac{R_{F2}}{(R_{F1} + R_{F2})} \right\} *$$

$$\left\{ \frac{g_m r_o (1 + sC_2(1+k)R_2)(1 + sC_F R_{F1})}{(1 + sC_F(R_{F1} \| R_{F2}))(1 + sC_2(r_o + R_2))} \right\} *$$

$$\left\{ \frac{\left(1 - \frac{sI_{LOAD}L}{D_p V_{BAT} - I_{LOAD} R_{DCR}}\right)(1 + sC_{OUT} R_{ESR})}{\left(\frac{s^2 LC_{OUT}}{D_p^2} + \frac{sC_{OUT}(R_{DCR} + R_{ESR})}{D_p^2} + 1\right)} \right\}$$

It should be noted that the resistor R2 (384) and equivalent capacitor of capacitor C2 (420) (for example, C2 (1+K)) causes a zero due to the factor $(1+sC_2(1+k)R_2)$, the resistor $R_{F1}$ (394) and the capacitor $C_F$ (392) causes a second zero due to the factor $(1+sC_F R_{F1})$, a pole caused by the capacitor $C_F$ (392) and resistors $R_{F1}$ (394) and $R_{F2}$ (396) due to the factor $(1+sC_F(R_{F1}\|R_{F2}))$ and a pole caused by the capacitor C2 (420) and the resistor R2 (384) causes a $(1+sC_2 (r_o+R_2))$.

Figure 5:
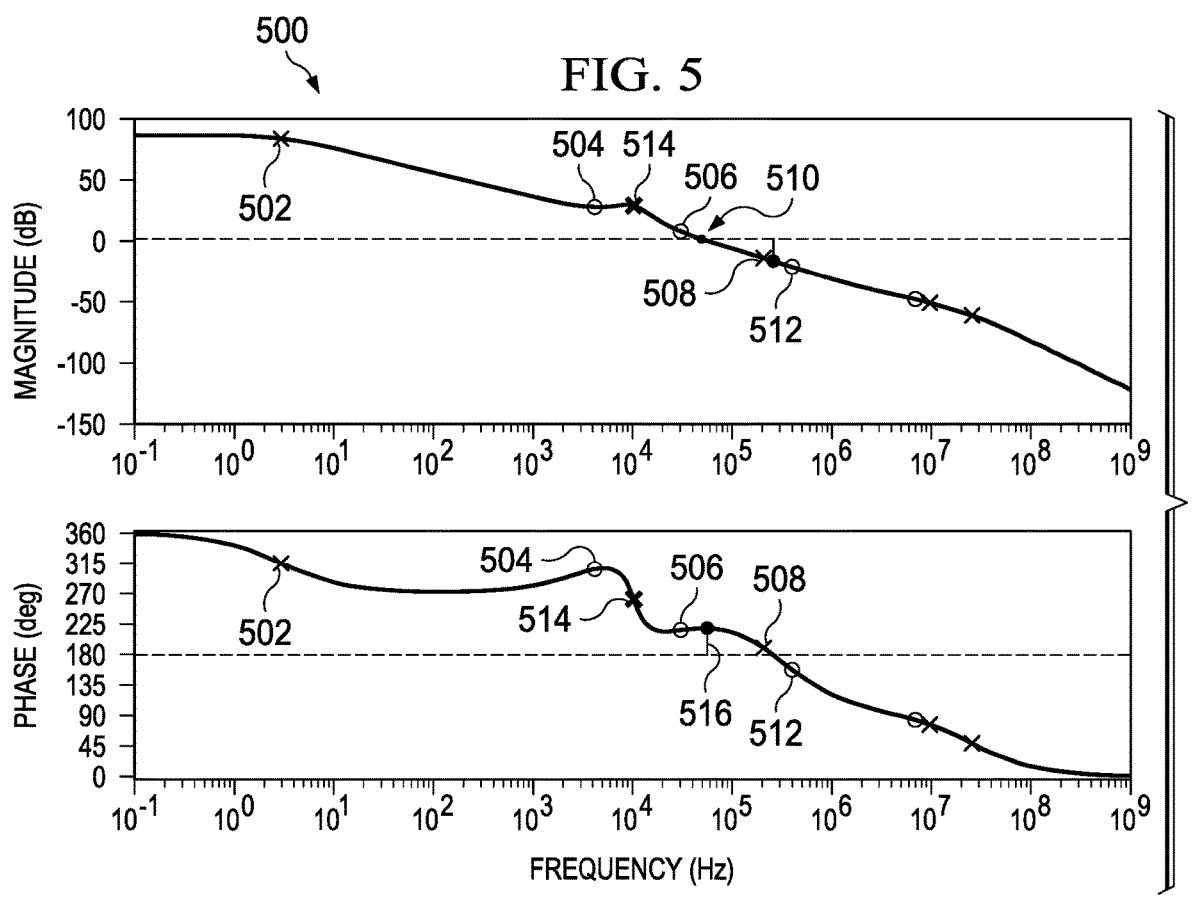
FIG. 5 illustrates a simulated Bode plot illustrating poles and zero introduced by compensation circuits of the controller in accordance with an example embodiment.

An example representation of a Bode plot 500 illustrating the introduction of two poles and two zeros by the first compensation circuit 380 and the second compensation circuit 390 is shown in FIG. 5. The Bode plot 500 illustrates a Bode gain plot (magnitude versus frequency) and a Bode phase plot (magnitude versus frequency). Particularly, the Bode plot 500 illustrates the location of the poles and zeros introduced by the compensation circuits 380 and 390 to stabilize the closed loop operation of the converter (100 or 150, or other converters derived from the converters 100 or 150).

As shown in the plot 500, a dominant pole 502 and a zero 504 are introduced by the first compensation circuit 380, and a zero 506 and a pole 508 are introduced by the second compensation circuit 390. As shown in the plot 500, the unity gain frequency (UGF) 510 is less than a frequency corresponding to the RHPZ (see, 512); for example, the RHPZ 512 is located outside the UGF 510 providing a phase margin of nearly 40 degree. For instance, referring to the Bode phase plot, the dominant pole 502 causes a 20 dB/decade gain fall that is stopped by the zero 504 and followed by the LC double pole (see, 514) that causes a rapid gain fall and phase change, thereby providing a sufficient phase margin (for example, nearly 40 degree, show by 516) at the UGF 510. Accordingly, the effects of the LC double pole 514 and the RHPZ 512 are compensated by the two poles and two zeros introduced by the compensation circuits 380 and 390.

In an example, for achieving the same (used with reference to FIG. 2) desired output voltage (VO) of 3.3 V from an input voltage (VBAT) of 3.6 V, the value of the capacitor $C_F$ (used with reference to FIG. 3) is about 20 pF and the value of the capacitor C2 is about 20 pF that are significantly smaller as compared to the values of the capacitor C1 and C2 used in the example scenario as described in reference to FIG. 2. It should be noted that the capacitors having capacitances of order of 20 pF can be configured on-chip, thereby avoiding any need of external components.

Figure 6:
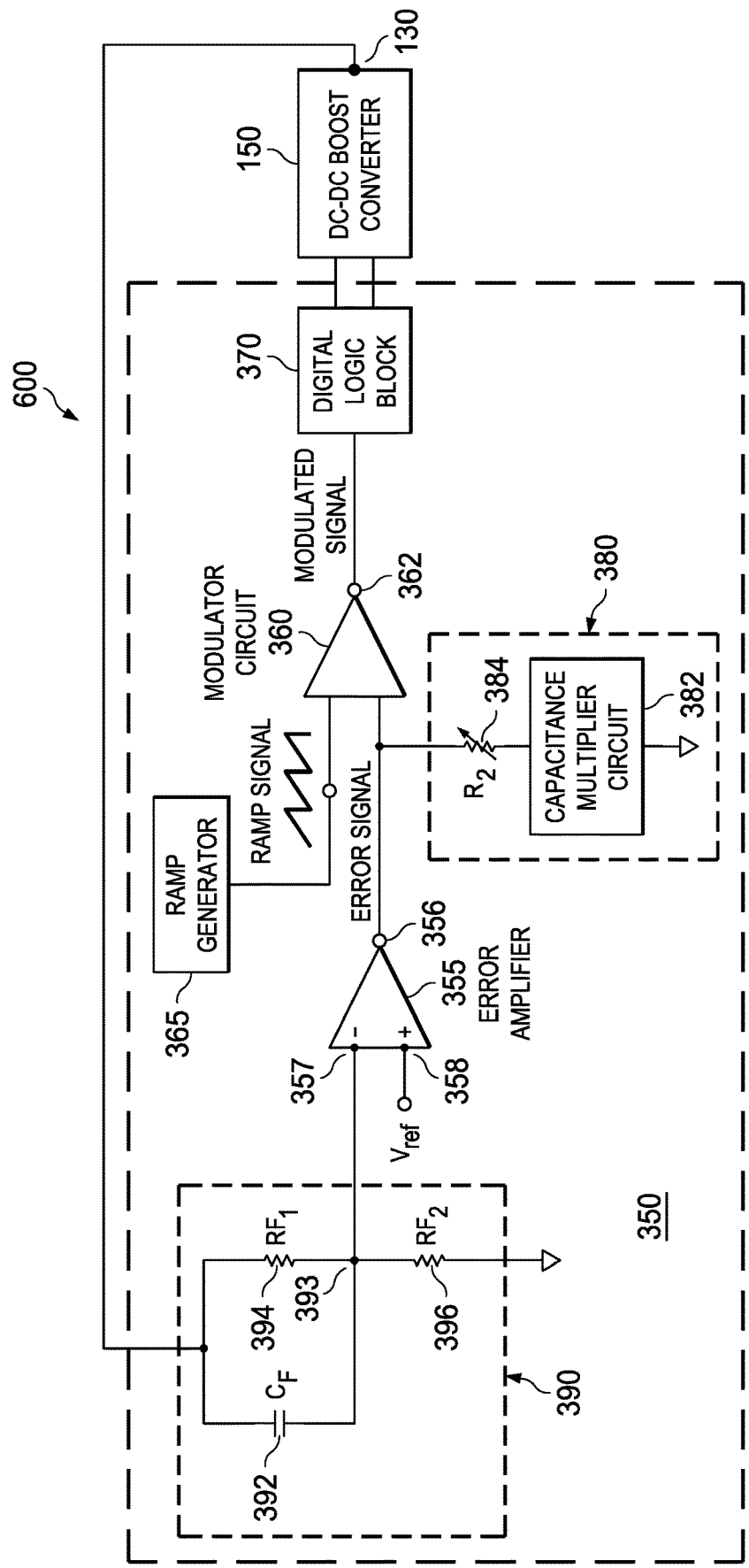
FIG. 6 illustrates an example schematic circuit diagram of a power converter and a controller in accordance with another example embodiment.

FIG. 6 illustrates an example circuit diagram of the power converter in accordance to another example embodiment of the present technology. As shown in FIG. 6, the circuit 600 includes a power converter such as a DC-DC boost converter 150. The boost converter 150 is already described in reference to FIG. 1B, and the controller 350 is described in conjunction with FIG. 3, and hence its description is omitted for the sake of brevity. The controller 350 is configured to compensate the LC double pole and RHPZ present in the transfer function of the DC-DC boost converter 150 as described with reference to FIGS. 3 to 5.

Without in any way limiting the scope, interpretation, or application of the claims appearing below, a technical effect of one or more of the example embodiments disclosed herein is to provide compensation in the power converter circuits such as a buck-boost converter circuit and/or a boost converter circuit. Various embodiments provide usage of circuits that require relatively smaller capacitors that can be configured on-chip. Accordingly, various embodiments preclude the need of employing external components such as capacitors for the compensation of the power converter circuits.

Although the present technology has been described with reference to specific example embodiments, it is noted that various modifications and changes may be made to these embodiments without departing from the broad spirit and scope of the present technology. For example, the various systems, modules, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various modules and methods may be embodied using transistors, logic gates, and electrical circuits (e.g., application specific integrated circuit (ASIC) circuitry and/or in Digital Signal Processor (DSP) circuitry).

Also, techniques, subsystems and methods described and illustrated in the various embodiments as discrete or separate may be combined or integrated with other systems, modules, techniques, or methods without departing from the scope of the present technology. Other items shown or discussed as directly coupled or connected with one another, or as directly communicating with each other, may be communicatively associated through some interface or device, such that the items may no longer be considered directly coupled or connected with one another, or directly communicating with each other, but may still be indirectly communicatively associated and in communication, whether electrically, mechanically, or otherwise, with one another. Other examples of changes, substitutions, and alterations ascertainable by one skilled in the art, upon studying the example embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment. Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions may be apparent and well within the spirit and scope of the technology.

Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. An integrated circuit comprising:
   a first compensation circuit that includes:
      a first resistor connected to a first node and to a second node;
      a first capacitor connected in parallel with the first resistor, the first capacitor connected to the first node and to the second node; and
      a second resistor connected to the second node and to a ground node;
   a first amplifier that includes a first input connected to the second node, a second input connected to receive a reference voltage, and an output configured to provide an error signal at a fifth node;
   a modulator that includes a first input coupled to receive a ramp signal, a second input coupled to the output of the first amplifier to receive the error signal, and an output configured to provide a modulation signal;
   a second compensation circuit that includes:
      a third resistor connected to the fifth node and to a third node;
      a second amplifier that includes a first input connected to the third node, a second input, and an output connected to the second input;
      a fourth resistor connected to the output of the second amplifier and a sixth node, wherein the sixth node is not directly connected to the third resistor;
      a fifth resistor connected to the sixth node and to the third node; and
      a second capacitor connected to the third node and to the ground node;
   and a switching circuit that includes an input coupled to the output of the modulator to receive the modulation signal and a set of outputs configured to couple to a power converter, wherein the first node is configured to couple to an output of the power converter.

2. The circuit of claim 1 further comprising a ramp generator that includes an output coupled to the first input of the modulator to provide the ramp signal.

3. The circuit of claim 1, wherein:
   the fifth resistor is a value R;
   the fourth resistor is a value K*R; and
   the second amplifier is configured to provide, at the third node, an equivalent capacitance of K times a capacitance of the second capacitor.

4. The circuit of claim 3, wherein the equivalent capacitance and a resistance of the third resistor are configured to produce a zero in a transfer function of the power converter.

5. The circuit of claim 1, wherein the first input of the first amplifier is an inverting input.

6. The circuit of claim 5, wherein the first amplifier is an inverting amplifier.

7. The circuit of claim 1, wherein the modulator is a pulse-width modulator.

8. The circuit of claim 1 further comprising the power converter.

9. The circuit of claim 8, wherein the power converter includes a DC-DC buck-boost converter.

10. The circuit of claim 9, wherein the DC-DC buck-boost converter includes:
    a first switch coupled between a power supply voltage and a fourth node;
    a second switch coupled between the fourth node and the ground node;
    an inductor having a first terminal and a second terminal, the first terminal of the inductor coupled to the fourth node;
    a third switch coupled between the second terminal of the inductor with the ground node; and
    a third capacitor having a first terminal and a second terminal; and
    a fourth switch coupled between the second terminal of the inductor with the first terminal of the third capacitor, wherein the second terminal of the third capacitor is coupled to the ground node, and wherein the first switch and the third switch are controlled by a first switching signal provided by the switching circuit and the second switch and the fourth switch are controlled by a second switching signal provided by the switching circuit.

11. A circuit comprising:
    a first compensation circuit that includes:
       a first resistor and a first capacitor connected in parallel to a first node and to a feedback node;
       a second resistor connected to the first node and to a ground node;

a first amplifier that includes a first input connected to the first node, a second input connected to receive a reference voltage, and an output configured to provide an error signal;

a modulator that includes a first input coupled to receive a ramp signal, a second input coupled to the output of the first amplifier to receive the error signal, and an output configured to provide a modulation signal;

a second compensation circuit that includes:
- a capacitance multiplier circuit, wherein the capacitance multiplier circuit includes:
  - a second amplifier that includes a first input connected to a third node, a second input, and an output connected to the second input;
  - a fourth resistor connected to the output of the second amplifier and a fourth node;
  - a fifth resistor connected to the fourth node and to the third node; and
  - a second capacitor connected to the third node and to the ground node; and
- a third resistor connected to the output of the first amplifier and to the capacitance multiplier circuit at the third node, wherein the third resistor is not directly connected to the fourth node; and a switching circuit that includes an input coupled to the output of the modulator to receive the modulation signal and a set of outputs configured to couple to a power converter, wherein the feedback node is configured to couple to an output of the power converter.

12. The circuit of claim 11, wherein:
the fifth resistor is a value R;
the fourth resistor is a value K*R; and
the second amplifier is configured to provide, at the third node, an equivalent capacitance of K times a capacitance of the second capacitor.

13. The circuit of claim 12, wherein the equivalent capacitance and a resistance of the third resistor are configured to produce a zero in a transfer function of the power converter.

14. The circuit of claim 11, wherein the third resistor is a variable resistor.

15. The circuit of claim 11 further comprising a ramp generator that includes an output coupled to the first input of the modulator to provide the ramp signal.

16. The circuit of claim 11, wherein the first input of the first amplifier is an inverting input and the first amplifier is an inverting amplifier.

17. The circuit of claim 11, wherein the modulator is a pulse-width modulator.

18. The circuit of claim 11 further comprising the power converter.

19. The circuit of claim 18, wherein the power converter includes a DC-DC buck-boost converter.

* * * * *